(12) United States Patent
Harada et al.

(10) Patent No.: US 8,471,992 B2
(45) Date of Patent: Jun. 25, 2013

(54) LIQUID CRYSTAL DISPLAY DEVICE AND METHOD FOR MANUFACTURING THE SAME

(75) Inventors: Kazuyuki Harada, Ishikawa-ken (JP); Hironori Yoshinaga, Ishikawa-ken (JP)

(73) Assignee: Japan Display Central Inc., Fukaya-shi (JP)

( * ) Notice: Subject to any disclaimer, the term of this patent is extended or adjusted under 35 U.S.C. 154(b) by 185 days.

(21) Appl. No.: 12/938,591

(22) Filed: Nov. 3, 2010

(65) Prior Publication Data

US 2011/0109862 A1    May 12, 2011

(30) Foreign Application Priority Data

Nov. 9, 2009   (JP) ................................. 2009-256351

(51) Int. Cl.
*G02F 1/134363*   (2006.01)

(52) U.S. Cl.
USPC .......................................................... 349/141

(58) Field of Classification Search
None
See application file for complete search history.

(56) References Cited

U.S. PATENT DOCUMENTS

| 2002/0089631 | A1* | 7/2002 | Lee et al. | 349/141 |
|---|---|---|---|---|
| 2002/0180920 | A1* | 12/2002 | Noh et al. | 349/141 |
| 2004/0257510 | A1* | 12/2004 | Chae | 349/141 |
| 2004/0263755 | A1* | 12/2004 | Kim et al. | 349/141 |
| 2005/0206824 | A1* | 9/2005 | Son et al. | 349/141 |
| 2008/0002079 | A1* | 1/2008 | Kimura | 349/42 |
| 2008/0218678 | A1 | 9/2008 | Nakayama et al. | |
| 2010/0060814 | A1 | 3/2010 | Harada et al. | |
| 2010/0097556 | A1* | 4/2010 | Do et al. | 349/141 |

FOREIGN PATENT DOCUMENTS

| JP | 2007-256980 | 10/2007 |
|---|---|---|
| JP | 2007-264080 | 10/2007 |
| JP | 2008-180928 | 8/2008 |
| JP | 2009-31468 | 2/2009 |
| JP | 2009-86114 | 4/2009 |

OTHER PUBLICATIONS

U.S. Appl. No. 13/371,798, filed Feb. 13, 2012, Harada, et al.
Office Action issued Aug. 2, 2011 in Japanese Patent Application No. 2009-256351 (English translation only).
U.S. Appl. No. 13/493,470, filed Jun. 11, 2012, Naoe, et al.

* cited by examiner

*Primary Examiner* — Thanh-Nhan P Nguyen
(74) *Attorney, Agent, or Firm* — Oblon, Spivak, McClelland, Maier & Neustadt, L.L.P.

(57) ABSTRACT

In one embodiment, a liquid crystal display device includes a plurality of pixel electrodes arranged in a matrix of rows and columns on a first substrate. A plurality of counter electrodes extend along the pixel electrodes in the row direction. Each of the counter electrodes includes a first counter electrode opposing to the plurality of pixel electrodes through a first insulating layer and a second counter electrode opposing to the first counter electrode through a second insulating layer. The first counter electrode is electrically connected with the second counter electrode through a contact hole formed in the second insulating layer. The wiring resistance of the second counter electrode is smaller than that of the first counter electrode.

22 Claims, 5 Drawing Sheets

LIQUID CRYSTAL DISPLAY DEVICE AND METHOD FOR MANUFACTURING THE SAME

CROSS-REFERENCE TO RELATED APPLICATION

This application is based upon and claims the benefit of priority from prior Japanese Patent Application No. 2009-256351, filed Nov. 9, 2009, the entire contents of which are incorporated herein by reference.

FIELD

The present invention relates to a liquid crystal display device and a method for manufacturing the same, and more particularly to a liquid crystal display device using an active matrix and a method for manufacturing the same.

BACKGROUND

The active-matrix type liquid crystal display device is equipped with a liquid crystal layer held between a pair of substrates which counter mutually, and a display portion which consists of a plurality of display pixels arranged in the shape of a matrix. One of the pair of substrates includes scan lines arranged along row lines of the display pixels, and signal lines arranged along column lines of the display pixels in the matrix. An alignment state of the liquid crystal molecule contained in the liquid crystal layer is controlled by an electrical field impressed to the liquid crystal layer.

Recently, liquid crystal display devices such as an IPS (In-Plane Switching) mode type and a FFS (Fringe Field Switching) mode type using a lateral electrical field have been proposed. The IPS mode type and the FFS mode type include a plurality of first electrodes arranged in the matrix and a second electrode that corresponds to the first electrodes on one of the substrates, and the state of an alignment of the liquid crystal molecule contained in the liquid crystal layer is controlled by the lateral electrical field generated between the first and second electrodes.

In the liquid crystal display, a line inversion driving method is proposed, in which the polarity of the impressed voltage to the liquid crystal layer is inversed for every scan line for preventing generation of a flicker phenomenon. When the line inversion driving method is adopted in the IPS mode or the FFS mode, the second electrode is arranged for every scan line, and the voltage supplied to the second electrode for every one-frame period is changed to either of the high (H) level and the low (L) level to inverse the polarity of the voltage impressed to the liquid crystal layer. In this structure, the alignment of the liquid crystal molecule contained in the liquid crystal layer is controlled by the voltage supplied to the second electrode and a picture signal voltage sequentially written in the first electrode.

Here, when the resistance of the second electrode becomes large, the difference in potential might arise between a position near a signal input end and in a position apart from the signal input end of the second electrode, which may result in generation of a cross talk.

Conventionally, in Japanese Patent Application Laid Open No. p2008-180928, the FFS mode type liquid crystal display device is proposed, in which a plurality of contact holes to electrically connect the switching element with the pixel electrode, and the common wiring with the common electrode, respectively are formed by single process when the pixel electrode and the common electrode are formed on a planarizing layer.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A liquid crystal display device and a method for manufacturing the same according to an exemplary embodiment of the present invention will now be described with reference to the accompanying drawings wherein the same or like reference numerals designate the same or corresponding parts throughout the several views.

According to one embodiment, a liquid crystal display device having a display portion includes: a first substrate; a second substrate; a liquid crystal layer held between the first and second substrates; a plurality of pixel electrodes arranged in a matrix of rows and columns on the first substrate; and a plurality of counter electrodes extending along the pixel electrodes in the row direction; the counter electrode including a first counter electrode opposing to the plurality of pixel electrodes through a first insulating layer and a second counter electrode opposing to the first counter electrode through a second insulating layer; wherein the first counter electrode is electrically connected with the second counter electrode through a contact hole formed in the second insulating layer, and the wiring resistance of the second counter electrode is smaller than that of the first counter electrode.

According to other embodiment, a method for manufacturing a liquid crystal display device having a plurality of pixel electrodes arranged in a matrix of rows and columns includes the steps: forming a first counter electrode on an array substrate through a first insulating layer; forming a second insulating layer on the first insulating layer so as to cover the first counter electrode; forming a second counter electrode on the second insulating layer; connecting the first counter electrode with the second counter electrode through a contact hole formed in the second insulating layer; forming a third insulating layer on the second insulating layer covering the second counter electrode; and forming a pixel electrode on the third insulating layer so as to face the second counter electrode; wherein a plurality of first and second counter electrodes respectively extend along the pixel electrodes in the row direction, and the wiring resistance of the first counter electrode is smaller than that of the second counter electrode.

Figure 1:
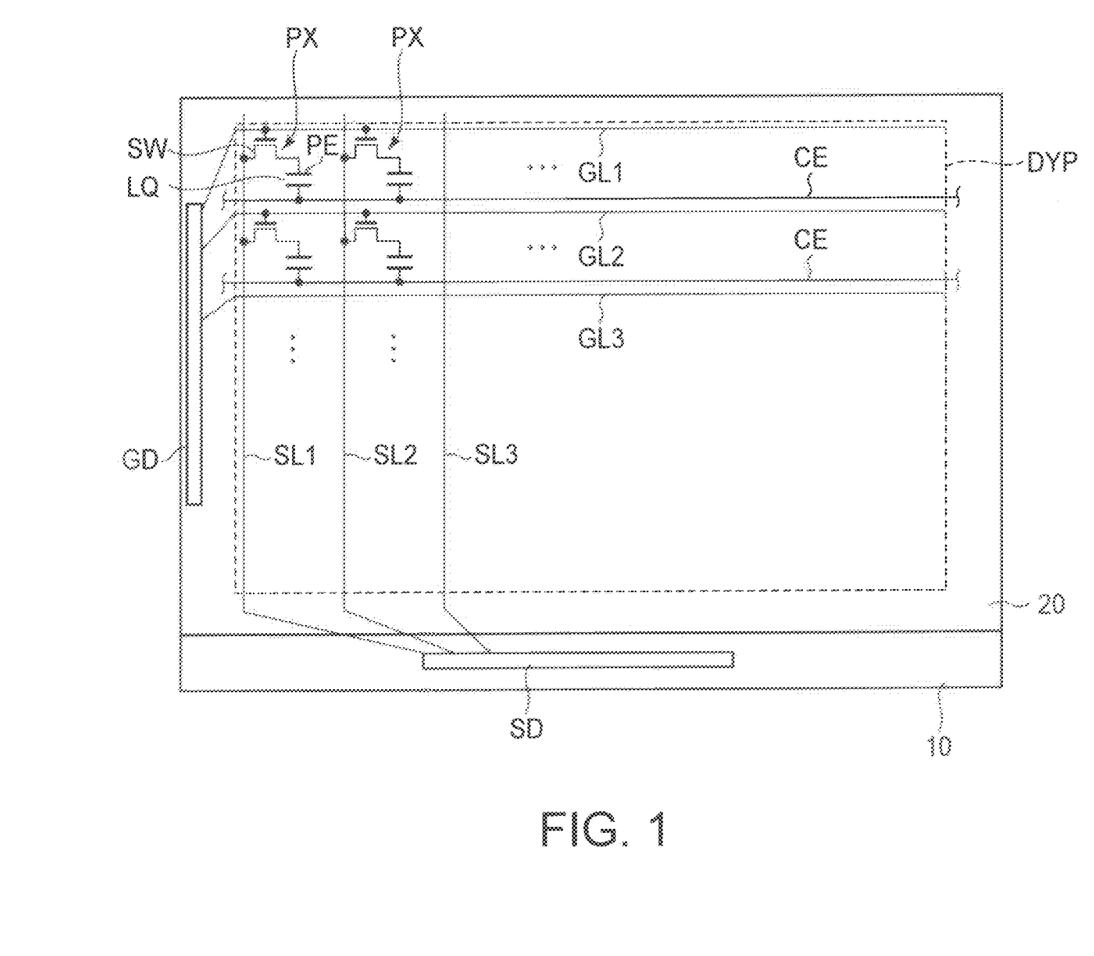
FIG. 1 is a figure showing a liquid crystal display device according to one embodiment of the present invention.

As shown in FIG. 1, the liquid crystal display device according to this embodiment is equipped with an array substrate 10, a counter substrate 20 arranged so as to oppose to the array substrate 10, a liquid crystal layer LQ held between the array substrate 10 and the counter substrate 20, and a display portion DYP including a plurality of pixels arranged in a matrix. The liquid crystal display device is illuminated from the array substrate 10 side by a back light which is not illustrated.

Figure 2:
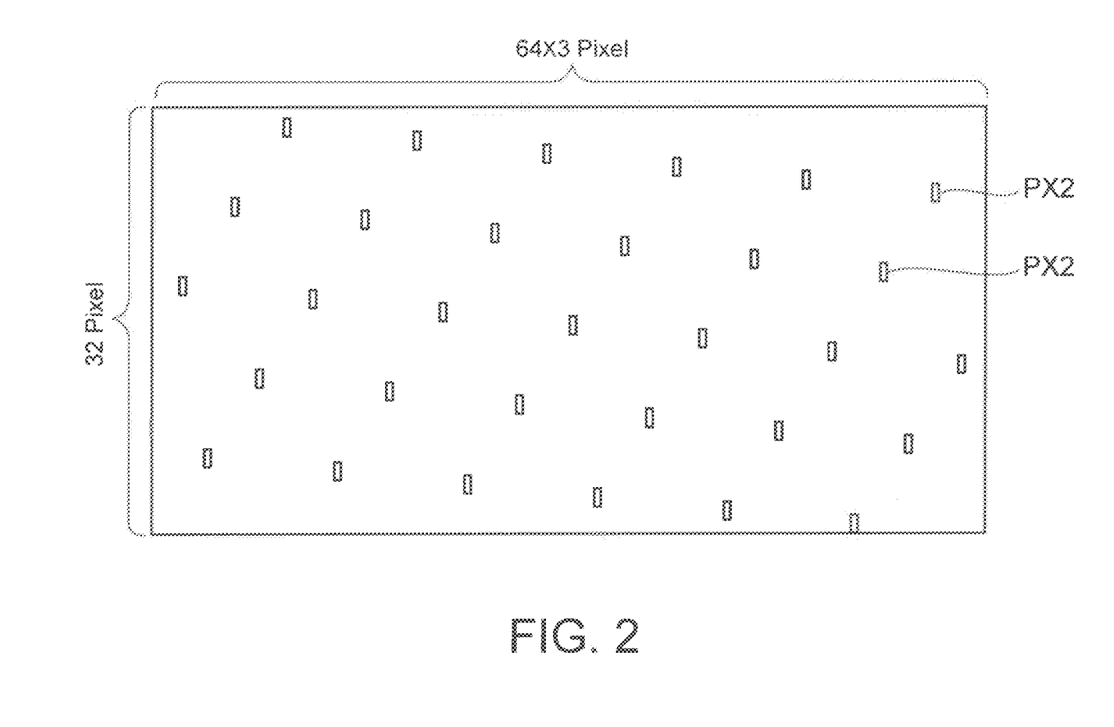
FIG. 2 is a schematic pattern layout of a display portion of the liquid crystal display device shown in FIG. 1.

A plurality of display pixels PX include a first display pixel PX1 and a second display pixel PX2 which are explained later. FIG. 2 shows an arrangement of the second display pixel PX2 in a unit area of the display portion DYP which consists of a plurality of display pixels PX arranged in a matrix of predetermined number of row lines and column lines. In the arrangement shown in FIG. 2, for example, in a unit area of (32 pixels: row)×(192 pixels: column), one second display pixel PX2 is arranged at each row line, that is, two or more second display pixels PX2 are not arranged in the same row line. Moreover, the second display pixels PX are arranged with a regular interval between the adjoining second pixels PX in the row direction of the whole display portion DYP.

Furthermore, in the arrangement shown in FIG. 2, the second display pixels PX2 are placed apart from each other beyond a fixed distance. The arrangement position of the second display pixels PX2 is determined so that one second display pixel PX2 is arranged at a center of a circle having a predetermined radius, and that other second display pixels PX2 are not arranged within the circle. That is, the second display pixels PX2 are not eccentrically arranged in the display portion DYP.

The array substrate 10 includes a transparent insulating substrate SB1 (shown in FIG. 5), pixel electrodes PE arranged in a matrix on the transparent array substrate SB1, a plurality of scan lines GL (GL1, GL2, GL3 . . . ) extending along the row lines of the pixel electrodes PE, a plurality of signal lines SL (SL1, SL2, SL3 . . . ) extending along the column lines of the pixel electrodes PE, a plurality of pixel switches SWP arranged near the positions where the scan lines GL and the signal lines SL cross each other, and a plurality of counter electrodes CE extending along the pixel electrodes PE arranged in the row direction. The pixel electrode PE and the pixel switch SW are arranged in each display pixel PX.

The scan lines GL are electrically connected to a scan line driving circuit GD arranged around the display portion DYP of the array circuit 10. The signal lines SL are electrically connected to a signal line driving circuit SD arranged around the display portion DYP of the array substrate 10.

The pixel switch SW includes a thin film transistor (TFT: Thin Film Transistor) as a switching element. A gate electrode of the thin film transistor is electrically connected with a corresponding scan line GL (or formed integrally). A source electrode of the thin film transistor is electrically connected with a corresponding signal line SL (or formed integrally). A drain electrode of the thin film transistor is electrically connected with a corresponding pixel electrode PE (or formed integrally).

Figure 3:
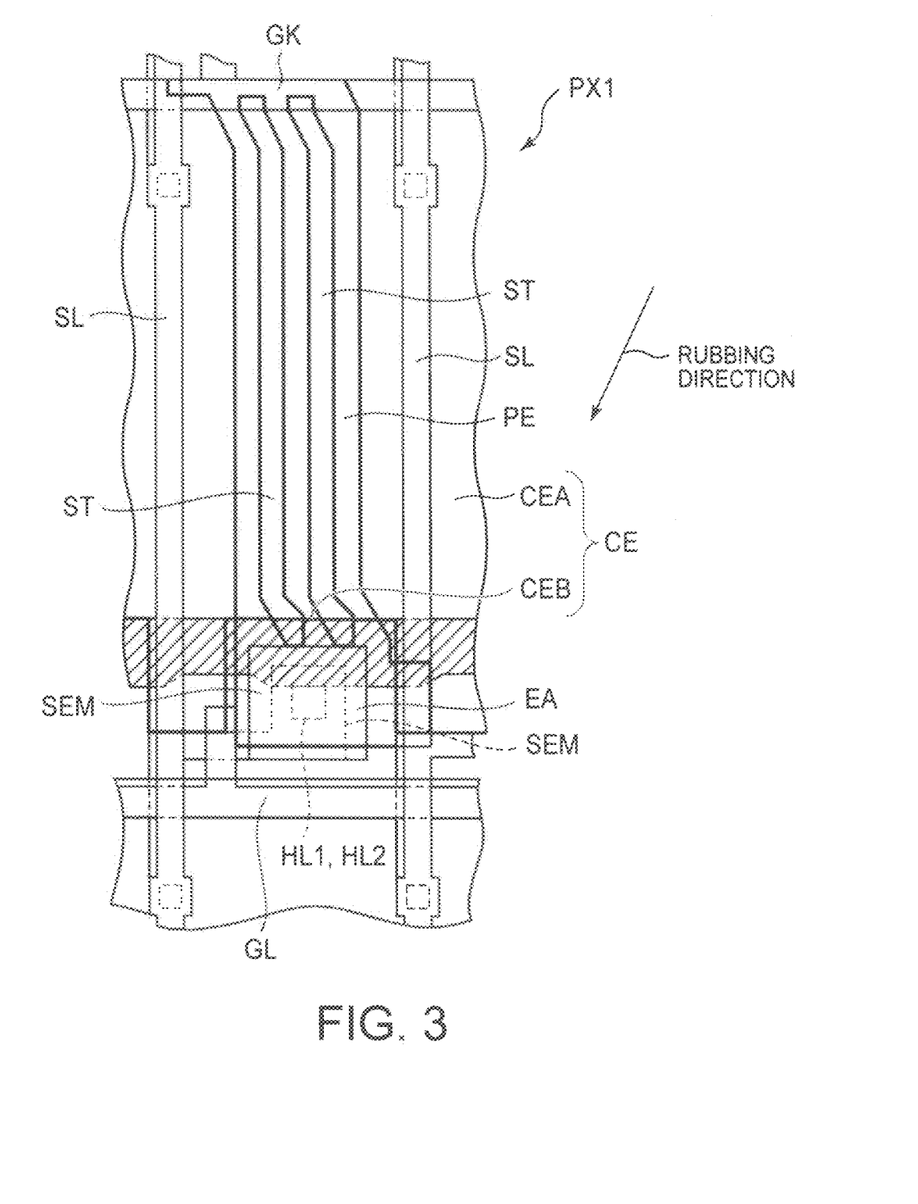
FIG. 3 is a pattern layout of pixels constituting the display portion of the liquid crystal display device shown in FIG. 1.
Figure 4:
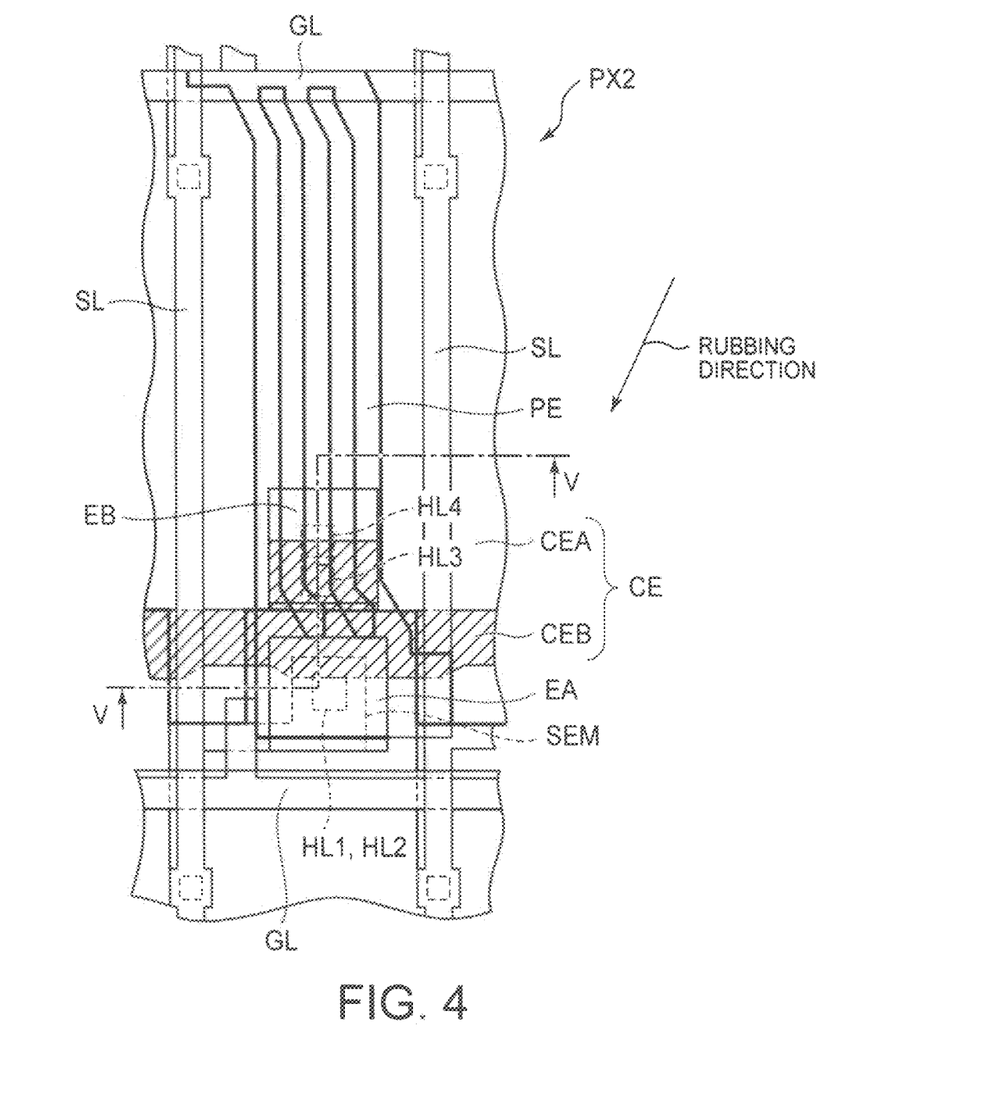
FIG. 4 is other pattern layout of pixels constituting the display portion of the liquid crystal display device shown in FIG. 1.
Figure 5:
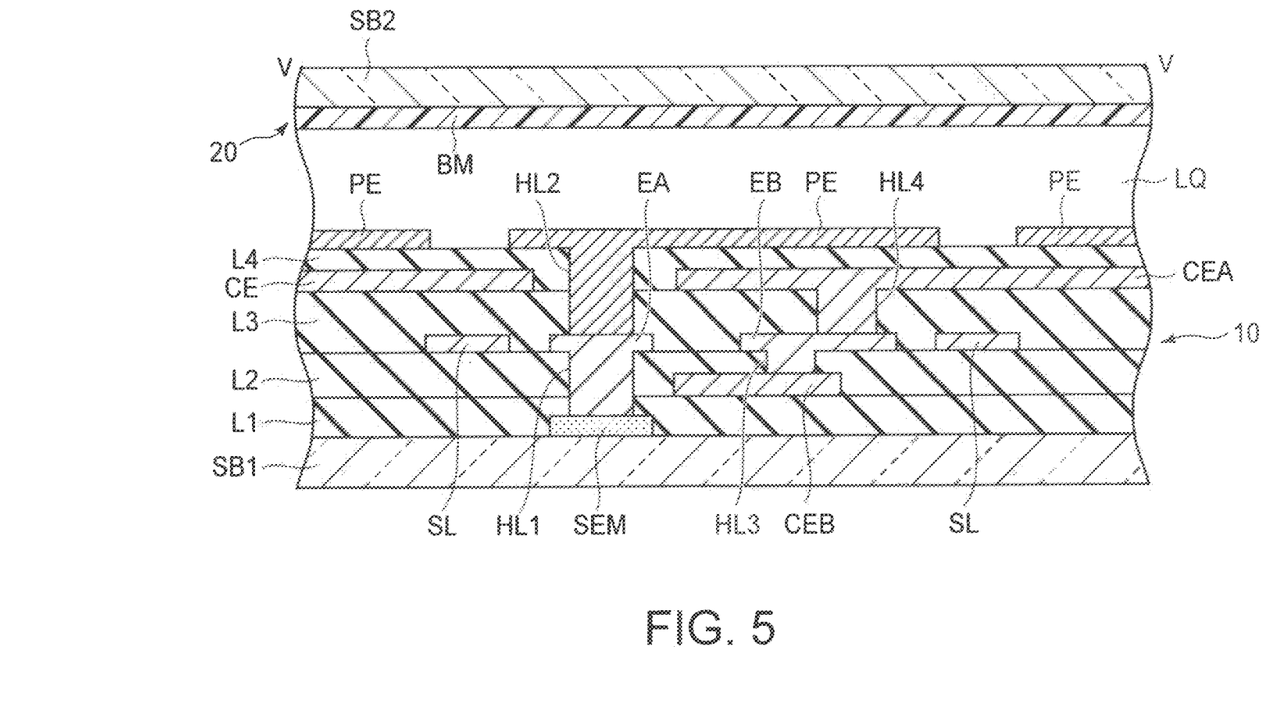
FIG. 5 is a cross-sectional view of the pixel taken along line V-V shown in FIG. 4.

As shown in FIG. 3 to FIG. 5, the counter electrode CE includes a first counter electrode CEA and a second counter electrode CEB. As shown in FIG. 5, the first counter electrode CEA is arranged so as to face a plurality of pixel electrodes PE through an insulating layer L4. In the second display pixel PX2, the second counter electrode CEB is arranged so as to counter the first counter electrode CEA through insulating layers L2 and L3.

As shown in FIG. 5, the pixel electrode PE is electrically connected with a semiconductor layer SEM by a contact hole HL1 and a contact hole HL2 formed in the insulating layers L1-L4, through a contact electrode EA. The contact electrode EA is arranged at the same layer as the signal line SL. The contact electrode EA is formed of three layers of titanium, aluminum, and titanium (TAT).

The pixel electrode PE and the first counter electrode CEA are, for example, formed of transparent conductive materials, such as ITO (Indium Tin Oxide). As shown in FIG. 3 and FIG. 4, the pixel electrode PE is equipped with slits ST. The slit ST extends in substantially parallel with the signal line SL. The end of the slit ST is bent to a direction in which the angle with a rubbing direction of an alignment film (not shown) becomes large with respect to the extending direction of the signal line SL. The bent structure of the slit is to achieve a complete alignment treatment.

A counter voltage is supplied to the counter electrode CE from both ends. In one-frame period, the polarity of the counter voltage supplied to the plurality of counter electrodes CE is inversed every one scan line or two or more scan lines. Furthermore, as for the counter voltage supplied to each counter electrode CE, the polarity is inversed for every one-frame period. Namely, the liquid crystal display device according to this embodiment adopts a line inversion driving method with which the polarity of electrical field supplied to the liquid crystal layer LQ is inversed for every one scan line or two or more scan lines.

The second counter electrode CEB is arranged at the same layer as the scan line GL. The second counter electrode CEB is, for example, formed of molybdenum tungsten (MoW). As shown in FIG. 4 to FIG. 5, in the second display pixel PX2, the first counter electrode CEA and the second counter electrode CEB are electrically connected using contact holes HL3 and HL4 formed in the insulating layers L2 and L3 respectively through a contact electrode EB. The contact electrode EB is arranged in the same layer as the signal line SL. The contact electrode EB is, for example, formed of three layers of titanium, aluminum, and titanium (TAT).

Namely, as shown in FIG. 3 to FIG. 5, the contact holes HL1 and HL2 to electrically connect the pixel electrode PE with the semiconductor layer (Poly-Si) SEM are formed in the first display pixel PX1. Furthermore, the contact holes HL3 and HL4 are formed to electrically connect the first counter electrode CEA with the second counter electrode CEB in the second display pixel PX2.

In the above-mentioned liquid crystal display, if an ON signal which makes the pixel switch SW turn on is supplied to the corresponding scan line GL, the ON signal is supplied to the gate electrode of the pixel switch SW. Consequently, a current pass is formed between the source electrode and the drain electrode of the pixel switch SW, and the supplied picture signal is written into the pixel electrode PE.

If a potential difference between the voltage impressed to the pixel electrode PE and the voltage impressed to the first counter electrode CEA arises, a slant electrical field arises from the first counter electrode CEA facing the slit of the pixel electrode PE to the pixel electrode PE, and a lateral electrical field arises in the liquid crystal layer LQ. The state of the alignment of the liquid crystal molecule (not shown) contained in the liquid crystal layer LQ is controlled by the lateral electrical field.

In addition, the lateral electrical field includes an electrical field ingredient in an approximately parallel direction with the substrate surface of the substrate SB1 in the array substrate 10 and is generated between the pixel electrode PE and the first counter electrode CEA arranged on the array substrate 10.

Here, when the counter electrode is, for example, formed of ITO, the wiring resistance of the counter electrode might become large, and the charging of the counter electrode might take time. Furthermore, when the time required for charging the counter electrode becomes long, the long time may result in a decrease in the display quality due to the cross talk.

Therefore, in the liquid crystal display device according to this embodiment, the counter electrode CE includes the first counter electrode CEA and the second counter electrode CEB extending in approximately parallel with the first counter electrode CEA, and the first and second counter electrodes CEA and CEB are electrically connected.

The second counter electrode CEB is formed of molybdenum tungsten, and the wiring resistance is smaller than ITO. The counter voltage from the counter electrode driving circuit (not shown) is supplied to the first counter electrode CEA and the second counter electrode CEB that is branched from the first counter electrode CEA at the both ends of the first counter electrode CEA. Moreover, the counter voltage is supplied to the first counter electrode CEA from the second counter electrode CEB at the second display pixel PX2 arranged in distribution in the display portion DYP. In this embodiment, since the second counter electrode CEB is formed of molybdenum tungsten, the wiring resistance is smaller than ITO. Accordingly, even if the wiring resistance of the first counter electrode CEA is large, the time to charge the first counter electrode CEA can be shortened, and the degradation of the display quality by the cross talk etc. is improved.

In addition, if the distribution rate of the second display pixel PX2 within the display portion DYP increases, the aperture ratio in the whole display portion DYP is decreased. On the other hand, if the interval by which the second display pixel PX2 is arranged becomes large, it becomes difficult for the wiring resistance of the first counter electrode CEA to make small enough. Therefore, the charging time of the first counter electrode CEA becomes long, and it becomes difficult to improve the degradation of the display quality. In addition, the charging time of the first counter electrode CEA is preferably set to be less than approximate 4μ seconds.

In this embodiment, in the unit area of the display portion DYP including the pixels arranged in the matrix of a predetermined rows and columns, one second display pixel PX2 is arranged at respective row lines and column lines, that is, two or more second pixels PX2 are not arranged in the same row and column lines, respectively. Moreover, in the whole display portion DYP, the second display pixels PX are arranged with a regular interval of the pixels PX in the row and column directions respectively. Furthermore, the second pixels PX2 are placed apart from each other beyond a predetermined distance in the row and column directions. The second pixels PX2 are not eccentrically arranged in the display portion DYP.

That is, one pair of contact holes HL3 and HL4 to connect the first counter electrode CEA with the second counter electrode CEB is provided in every one row and one column of the pixels within the unit area. Therefore, the pair of contact holes HL3 and HL4 is arranged with a predetermined interval along the row line of the whole display portion DYP.

Thus, it is avoided that the luminosity unevenness in a lateral line shape occurs in the row and column directions by arranging the second display pixels PX2 as mentioned above. Moreover, the degradation of the display quality due to the cross talk etc. is improved by setting the interval of the position where the first counter electrode CEA and the second counter electrode CEB are electrically connected so that the charging time of the first counter electrode CEA becomes short enough.

As mentioned above, according to the liquid crystal display device according to this embodiment, a high quality liquid crystal display device can be offered.

Furthermore, in this embodiment, the second counter electrode CEB is formed in the same layer as the scan line GL. Therefore, it is not necessary to prepare additional electric conductive layers in order to form the second counter electrode CEB, and it can be avoided that a manufacturing cost becomes high.

As shown in FIG. 2, the arrangement position of the second display pixel PX2 is an example. If the aperture ratio of the display portion DYP is larger than a predetermined value, and if the arrangement of the second display pixel PX is set so that the charging time of the counter electrode CE may become short enough, the arrangement is not restricted to that shown in FIG. 2.

While certain embodiments have been described, these embodiments have been presented by way of example only, and are not intended to limit the scope of the inventions. In practice, the structural and method elements can be modified without departing from the spirit of the invention. Various embodiments can be made by properly combining the structural and method elements disclosed in the embodiments. For example, some structural and method elements may be omitted from all the structural and method elements disclosed in the embodiments. Furthermore, the structural and method elements in different embodiments may properly be combined. The accompanying claims and their equivalents are intended to cover such forms or modifications as would fall with the scope and spirit of the inventions.

What is claimed is:

1. A liquid crystal display device having a display portion, comprising:
　a first substrate;
　a second substrate facing the first substrate;
　a liquid crystal layer held between the first and second substrates;
　a plurality of pixel electrodes arranged in a matrix of rows and columns on the first substrate; and
　a plurality of counter electrodes extending along the pixel electrodes in the row direction; the counter electrode including a first counter electrode opposing to the plurality of pixel electrodes through a first insulating layer and a second counter electrode opposing to the first counter electrode through a second insulating layer;
　wherein the first counter electrode is electrically connected with the second counter electrode through a contact hole formed in the second insulating layer, and the wiring resistance of the second counter electrode is smaller than that of the first counter electrode, and
　wherein only one contact hole to connect the first counter electrode with the second counter electrode is provided in one row line and in one column line, respectively, within one unit area of the display portion in which the pixel electrodes are arranged in a matrix formed of a predetermined number of the rows and columns, wherein said one unit area comprises a plurality of unit pixels.

2. The liquid crystal display device according to claim 1, further comprising a plurality of scan lines extending along the pixel electrodes arranged in the row direction and a plurality of signal lines extending along the pixel electrodes arranged in the column direction, wherein the second counter electrode is arranged in the same layer as the scan line.

3. The liquid crystal display device according to claim 2, wherein the polarity of a potential impressed to the liquid crystal layer is inverted for every one or more scan lines by changing the potential of the counter electrode.

4. The liquid crystal display device according to claim 1, wherein the first counter electrode is formed of ITO (Indium Tin Oxide).

5. The liquid crystal display device according to claim 4, wherein the second counter electrode is formed of molybdenum tungsten.

6. The liquid crystal display device according to claim 1, wherein the liquid crystal display device uses one of the IPS mode and FFS mode.

7. A liquid crystal display device having a display portion, comprising:
a first substrate having scan lines and signal lines arranged in crossing with the scan lines;
a second substrate facing the first substrate;
a liquid crystal layer held between the first and second substrates;
a semiconductor layer formed on the first substrate;
a first insulating layer formed on the first substrate so as to cover the semiconductor layer;
a first counter electrode formed on the first insulating layer,
a second insulating layer formed on the first insulating layer and covering the first counter electrode;
a contact electrode connected with the first counter electrode through a first contact hole formed in the second insulating layer;
a third insulating layer formed on the second insulating layer and covering the contact electrode;
a second counter electrode formed on the third insulating layer and connected with the contact electrode through a second contact hole formed in the third insulating layer;
a fourth insulating layer formed on the third insulating layer and covering the second counter electrode; and
a pixel electrode formed on the fourth insulating layer so as to face the second counter electrode and connected with the semiconductor layer through a third contact hole formed in the first, second, third and fourth insulating layers by penetrating; wherein
a plurality of pixel electrodes are arranged in a matrix of rows and columns on the first substrate,
a plurality of first and second counter electrodes extend with the pixel electrodes in the row direction,
the wiring resistance of the first counter electrode is smaller than that of the second counter electrode, and
only one contact hole to connect the first counter electrode with the second counter electrode is provided in one row line and in one column line, respectively, within one unit area of the display portion in which the pixel electrodes are arranged in a matrix formed of a predetermined number of the rows and columns, wherein said one unit area comprises a plurality of unit pixels.

8. The liquid crystal display device according to claim 7, wherein the second counter electrode is formed of ITO (Indium Tin Oxide).

9. The liquid crystal display device according to claim 8, wherein the first counter electrode is formed of molybdenum tungsten.

10. The liquid crystal display device according to claim 7, wherein the first counter electrode is arranged in the same layer as the scan lines.

11. The liquid crystal display device according to claim 7, wherein the pixel electrode is connected with the semiconductor layer through a contact electrode.

12. The liquid crystal display device according to claim 11, wherein
the contact electrode is formed of three layers of titanium, aluminum, and titanium (TAT).

13. The liquid crystal display device according to claim 7, wherein the signal line is formed on the first insulating layer.

14. A method for manufacturing a liquid crystal display device having a display portion and a plurality of pixel electrodes arranged in a matrix of rows and columns, comprising:
forming a first counter electrode on an array substrate through a first insulating layer;
forming a second insulating layer on the first insulating layer so as to cover the first counter electrode;
forming a second counter electrode on the second insulating layer;
connecting the first counter electrode with the second counter electrode through a contact hole formed in the second insulating layer;
forming a third insulating layer on the second insulating layer covering the second counter electrode; and
forming a pixel electrode on the third insulating layer so as to face the second counter electrode; wherein
a plurality of first and second counter electrodes respectively extend along the pixel electrodes arranged in the row direction,
the wiring resistance of the first counter electrode is smaller than that of the second counter electrode, and
only one contact hole to connect the first counter electrode with the second counter electrode is provided in one row line and in one column line, respectively, within one unit area of the display portion in which the pixel electrodes arranged in a matrix formed of a predetermined number of the rows and columns, wherein said one unit area comprises a plurality of unit pixels.

15. The method for manufacturing a liquid crystal display device according to claim 14, wherein the second counter electrode is formed of ITO (Indium Tin Oxide).

16. The method for manufacturing a liquid crystal display device according to claim 14, wherein the first counter electrode is formed of molybdenum tungsten.

17. The method for manufacturing a liquid crystal display device according to claim 14, wherein the liquid crystal display device uses one of the IPS mode and FFS mode.

18. The method for manufacturing a liquid crystal display device according to claim 14, further comprising scan lines and signal lines in crossing with the scan lines formed on the array substrate, wherein the first counter electrode is arranged in the same layer as the scan lines.

19. A liquid crystal display device having a display portion, comprising:
a first substrate;
a second substrate facing the first substrate;
a liquid crystal layer held between the first and second substrates; and
a plurality of display pixels arranged in a matrix of rows and columns including first and second pixels; wherein
the first substrate includes a pixel electrode arranged in the respective display pixels and a plurality of counter electrodes extending along the display pixel electrodes in the row direction,
only one second pixel is provided in one row line and in one column line, respectively, within one unit area of the display portion in which the pixel electrodes arranged in a matrix formed of a predetermined number of the rows and columns, wherein said one unit area comprises a plurality of unit pixels,
the counter electrode includes a first counter electrode arranged opposing to the plurality of pixel electrodes through a first insulating layer and a second counter electrode opposing to the first counter electrode through a second insulating layer, the first counter electrode is electrically connected with the second counter electrode through a contact hole formed in the second insulating layer in the second pixel, and the wiring resistance of the second counter electrode is smaller than that of the first counter electrode.

20. The liquid crystal display device according to claim 19, further comprising a plurality of scan lines extending along the pixel electrodes arranged in the row direction and a plurality of signal lines extending along the pixel electrodes arranged in the column direction, wherein the second counter electrode is arranged in the same layer as the scan line.

21. The liquid crystal display device according to claim 19, wherein the first counter electrode is formed of ITO (Indium Tin Oxide).

22. The liquid crystal display device according to claim 19, wherein the second pixel is arranged apart from each other beyond a predetermined distance, and only one of the second pixels is arranged at a center of a circle having a predetermined radius, and other second pixels are not arranged within the circle.

* * * * *